(12) United States Patent
Carroll et al.

(10) Patent No.: US 11,501,265 B2
(45) Date of Patent: *Nov. 15, 2022

(54) CREATING ELECTRONIC CALENDAR ENTRIES FROM EMAIL MESSAGES

(71) Applicant: GOOGLE LLC, Mountain View, CA (US)

(72) Inventors: Glenn Alan Carroll, San Francisco, CA (US); Carl Phillip Sjogreen, San Francisco, CA (US); David P. Marmaros, Los Altos, CA (US); Harish Venkataramani, Belmont, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/248,195

(22) Filed: Jan. 13, 2021

(65) Prior Publication Data
US 2021/0133694 A1 May 6, 2021

Related U.S. Application Data

(63) Continuation of application No. 15/819,716, filed on Nov. 21, 2017, now Pat. No. 10,943,214, which is a
(Continued)

(51) Int. Cl.
G06F 15/16 (2006.01)
G06Q 10/10 (2012.01)
(Continued)

(52) U.S. Cl.
CPC ....... G06Q 10/1095 (2013.01); G06F 3/0481 (2013.01); G06Q 10/107 (2013.01); G06Q 10/109 (2013.01); H04L 51/046 (2013.01)

(58) Field of Classification Search
CPC ............ G06Q 10/1095; G06Q 10/107; G06Q 10/109; G06F 3/0481; H04L 51/046
See application file for complete search history.

(56) References Cited

U.S. PATENT DOCUMENTS 4,839,853 A   6/1989   Deerwester et al.
4,965,763 A  10/1990   Zamora
(Continued)

FOREIGN PATENT DOCUMENTS

EP   1104151 A2   5/2001
EP   1109121 A2   6/2001
(Continued)

OTHER PUBLICATIONS

U.S. Appl. No. 11/734,682, filed Apr. 12, 2007.
(Continued)

Primary Examiner — Suraj M Joshi
Assistant Examiner — Jaren Means
(74) Attorney, Agent, or Firm — Brake Hughes Bellermann LLP

(57) ABSTRACT

A method, system, and data structure for creating electronic calendar entries are disclosed. One aspect of the invention involves a computer data structure that includes an email message with an embedded link. The embedded link contains event information corresponding to multiple parameters for an event described in the email message. The embedded link is configured, upon activation, to initiate generation of an electronic calendar entry form with multiple fields. A plurality of the multiple fields contain event information from the embedded link.

20 Claims, 12 Drawing Sheets

Related U.S. Application Data continuation of application No. 14/716,586, filed on May 19, 2015, now Pat. No. 9,842,319, which is a continuation of application No. 13/761,021, filed on Feb. 6, 2013, now Pat. No. 9,092,109, which is a continuation of application No. 13/584,751, filed on Aug. 13, 2012, now Pat. No. 8,375,099, which is a continuation of application No. 13/296,985, filed on Nov. 15, 2011, now Pat. No. 8,244,821, which is a continuation of application No. 11/734,682, filed on Apr. 12, 2007, now Pat. No. 8,060,567.

(60) Provisional application No. 60/791,959, filed on Apr. 12, 2006.

(51) Int. Cl.
  *H04L 51/046* (2022.01)
  *G06F 3/0481* (2022.01)

(56) References Cited

U.S. PATENT DOCUMENTS

| | | | |
|---|---|---|---|
| 5,966,686 | A | 10/1999 | Heidorn et al. |
| 5,999,938 | A | 12/1999 | Bliss et al. |
| 6,216,110 | B1 | 4/2001 | Silverberg |
| 6,285,999 | B1 | 9/2001 | Page |
| 6,369,840 | B1 | 4/2002 | Barnett et al. |
| 2002/0194379 | A1 | 12/2002 | Bennett et al. |
| 2003/0115188 | A1 | 6/2003 | Srinivasa et al. |
| 2004/0034635 | A1 | 2/2004 | Czarnecki et al. |
| 2004/0243677 | A1* | 12/2004 | Curbow ............... G06Q 10/109 709/206 |
| 2005/0021858 | A1 | 1/2005 | Ruston et al. |
| 2005/0091095 | A1 | 4/2005 | Wilbrink et al. |
| 2005/0149858 | A1 | 7/2005 | Stern et al. |
| 2005/0261011 | A1 | 11/2005 | Scott |
| 2005/0289180 | A1* | 12/2005 | Pabla .................... G06Q 10/10 |
| 2007/0073810 | A1 | 3/2007 | Adams et al. |
| 2007/0130275 | A1 | 6/2007 | Maresh |
| 2007/0150513 | A1* | 6/2007 | Vanden Heuvel .... G06F 40/284 |
| 2007/0226204 | A1 | 9/2007 | Feldman |

FOREIGN PATENT DOCUMENTS

| | | |
|---|---|---|
| EP | 1808802 A1 | 7/2007 |
| WO | 1999/038079 A1 | 7/1999 |
| WO | 2007/121329 A1 | 10/2007 |

OTHER PUBLICATIONS

U.S. Appl. No. 13/296,985, filed Nov. 15, 2011.
U.S. Appl. No. 13/584,751, filed Aug. 13, 2012.
U.S. Appl. No. 13/761,021, filed Feb. 6, 2013.
U.S. Appl. No. 14/716,586, filed May 19, 2015.
U.S. Appl. No. 15/819,716, filed Nov. 21, 2017.
"One Box Entry", 30 Boxes | Help, available online at <https://www.30boxes.com/help>, retrieved on Mar. 20, 2006, 2 pages.
Black et al., "Automated Event Extraction from Email", available online at <https//nlp.stanford.edu/courses/cs224n/2004/jblack-final-report.pdf>, 2004, 12 pages.
Califf et al., "Relational Learning of Pattern-Match Rules for Information Extraction", Computational Natural Language Learning, 1997, pp. 9-15.
Carvalho et al., "On the Collective Classification of Email 'Speech Acts'", Proceedings of 28th Annual International ACM SIGIR Conference on Research and Development in Information Retrieval, Aug. 15-19, 2005, 8 pages.
Chinchor, Nancy A., "Overview of MUC-7/MET-2", available on line at <http://www.itl.nist.gov/iaui/894.02/related_projects/muc/proceedings/muc_7_proceedings/overview.html>, 1998, 5 pages.
Ciravegna, Fabio, "(LP)2: Rule Induction for Information Extraction Using Linguistic Constraints", Technical Report CS-03-07, Sep. 29, 2003, pp. 1-29.
Corston-Oliver et al., "Integration of Email and Task Lists", Proceedings of American Association for Artificial Intelligence, 2004, 2 pages.
"Creating a Calendar Entry From a Lotus Notes Email", Morgan, Lewis & Bockius, LLP, Technology Tip (Internal Firm Document), Oct. 7, 2005, 2 pages.
Dawson et al., "Internet Calendaring and Scheduling Core Object Specification (iCalendar)", available on line at <http://www.ietf.org/rfc/rfc2445.txt>, Nov. 1998, 139 pages.
Freitag, Dayne, "Using Grammatical Inference to Improve Precision in Information Extraction", In Workshop on Automation Induction, Grammatical Inference, and Language Acquisition, 1997, 10 pages.
"HCalendar", Developers Wiki, available online at <http://developers.technorati.com/wiki/hCalendar?action=print>, 2004, 6 pages.
Hogue et al., "Thresher: Automating the Unwrapping of Semantic Content from the World Wide Web", Proceedings of 4th International Conference on World Wide Web, May 10-14, 2005, pp. 86-95.
Jackson et al., "SEXY: The Stanford Event eXtraction sYstem", Department of Computer Science, Dec. 2, 2003, pp. 1-15.
Mani, Inderjeet, "Recent Developments in Temporal Information Extraction", Proceedings of RANLP, 2004, pp. 1-18.
Minkov et al., "Extracting Personal Names from Emails: Applying Named Entity Recognition to Informal Text", available online at <https://pdfs.semanticscholar.org/b3e2/2461007336b0ab3fdf5b535fe98a396250b9.pdf>, 2004, 26 pages.
Modi et al., "CMRadar: A Personal Assistant Agent for Calendar Management", International Workshop on Agent-Oriented Information Systems (AOIS), 2004, 15 pages.
"MUC-7 Table of Contents", Message Understanding Conference Proceedings, available online at <http://www-nlpir.nist.gov/related_projects/muc/proceedings/muc_7_toc.html>, Jan. 12, 2001, 5 pages.
Jim, "30 Boxes v. Spongecell Using Natural Language Entry", New Media Crossroads, 2006, 10 pages.
Payne et al., "Calendar Agents on the Semantic Web", IEEE Intelligent Systems, 2002, pp. 84-86.
Resig, John, "Date Extraction", available online at <https://johnresig.com/blog/date_extraction/>, Mar. 28, 2005, 2 pages.
Baker, Loren, "Screenshots of Google Calendar CL2 from TechCrunch", Search Engine Journal, Mar. 8, 2006, 4 pages.
"Sharing Microsoft Outlook Calendar and Contacts", available online at <http://www.devnewsgroups.net/link.aspx?url=http://www.slipstick.com/outlook/share.htm#info>, retrieved on Jun. 22, 2005, 9 pages.
Soffront Software Inc., "Soffront Outlook Integration Datasheet", 2005, 4 pages.
"Spongecell—The Absorbful Calendar", available online at <https://www.spongecell.com/>, Retrieved on Mar. 21, 2006, 4 pages.
"New Spongecell Calendar the Easiest Online Planning Tool for Friends to Share", Spongecell Press Release, retrieved on Mar. 21, 2006, 1 page.
"Spongecell releases Natural Language Calendaring API", available online at <http://digg.com/technology/Spongecell_releases_Natural_Language_Calendaring_API>, retrieved on Mar. 21, 2006, 1 page.
Stevenson, Reed, "PluggedIn: Online Calendars Make a Comeback", Yahoo News, 2005, 2 pages.
Cubrilovic, Nik, "30 Boxes Ready to Take Out Online Calendar Space", available online at <http://www.techcrunch.com/2006/03/11/30-boxes-ready-to-take-out-online-calendar-space/>, Mar. 11, 2006, 15 pages.
Arrington, Michael, "Exclusive Screenshots: Google Calendar", available online at <http://www.techcrunch.com/2006/03/08/exclusive-screenshots-google-calendar/>, Mar. 8, 2006, 16 pages.
Arrington, Michael, "SpongeCell, an Ajax Calendar", available online st <http://www.techcrunch.com/2006/01/30/spongecell-an-ajax-calendar/>, Jan. 30, 2006, 11 pages.
Yee, Ka-Ping, "User-Directed Screen Reading for Context Menus on Freeform Text", CHI 2003, available online at <http://zesty.ca/udsr/yee-udsr-chi2003-short.pdf>, Apr. 5-10, 2003, 2 pages.

(56) References Cited

OTHER PUBLICATIONS

Zhou et al., "Named Entity Recognition using an HMM-based Chunk Tagger", Proceedings of 40th Annual Meeting of the Association for Computational Linguistics, Jul. 2002, pp. 473-480.
International Search Report and Written Opinion received for PCT Patent Application No. PCT/US2007/066576, dated Oct. 2, 2007, 8 pages.

* cited by examiner

CREATING ELECTRONIC CALENDAR ENTRIES FROM EMAIL MESSAGES

CROSS REFERENCE TO RELATED APPLICATIONS

This application is a continuation and claims priority to U.S. application Ser. No. 15/819,716, filed Nov. 21, 2017, which is a continuation of U.S. application Ser. No. 14/716, 586, filed May 19, 2015, now U.S. Pat. No. 9,842,319, which is a continuation of U.S. application Ser. No. 13/761, 021, filed Feb. 6, 2013, now U.S. Pat. No. 9,092,109, which is a continuation of U.S. application Ser. No. 13/584,751, filed Aug. 13, 2012, now U.S. Pat. No. 8,375,099, which is a continuation of U.S. application Ser. No. 13/296,985, filed Nov. 15, 2011, now U.S. Pat. No. 8,244,821, which is a continuation of U.S. application Ser. No. 11/734,682, filed Apr. 12, 2007, now U.S. Pat. No. 8,060,567, which claims the benefit of U.S. Provisional Application No. 60/791,959, filed Apr. 12, 2006, the disclosures of all of which applications are incorporated by reference herein in their entireties.

TECHNICAL FIELD

The disclosed embodiments relate generally to electronic calendars. More particularly, the disclosed embodiments relate to methods, systems, graphical user interfaces, and data structures for creating electronic calendar entries from email messages.

BACKGROUND

Electronic calendars are increasingly used to organize our lives. Such calendars are accessed from both desktop computers and portable computing devices (e.g., laptop computers, personal digital assistants (PDAs), mobile phones, and wearable computers).

One problem that limits more widespread use of electronic calendars is the process of filling out electronic calendar entries. Current calendar entry techniques are cumbersome and inefficient. Users typically must type or cut-and-paste data into multiple calendar fields (e.g., date, start time, end time, location, activity, and people involved). Some research groups have tried to develop systems (e.g., the Stanford Event eXtraction sYstem) that automatically create calendar entries from free-form e-mail messages, with limited success.

Thus, it would be highly desirable to find new, more efficient ways to create electronic calendar entries from email messages.

SUMMARY OF THE INVENTION

The present invention overcomes the limitations and disadvantages described above by providing methods, systems, GUIs, and data structures for creating electronic calendar entries from email messages.

One aspect of the invention involves a computer-implemented method in which a server computer receives an email message for a user; determines a plurality of parameters for an event described in the email message; and sends the email message, along with an embedded link, to a computer associated with the user. The embedded link contains event information corresponding to at least some of the determined parameters for the event. In response to activation of the embedded link, the server sends an electronic calendar entry form with multiple fields to the computer associated with the user. A plurality of the multiple fields contain event information from the embedded link.

Another aspect of the invention involves a computer-implemented method in which a client computer receives an email message, with an embedded link, from a remote computer. The embedded link contains event information corresponding to multiple parameters for an event described in the email message. In response to activation of the embedded link, the client computer receives and displays an electronic calendar entry form with multiple fields. A plurality of the multiple fields contain event information from the embedded link.

Another aspect of the invention involves a graphical user interface that includes an email message with an embedded link. The embedded link contains event information corresponding to multiple parameters for an event described in the email message. The embedded link is configured, upon activation, to initiate generation of an electronic calendar entry form with multiple fields. A plurality of the multiple fields contain event information from the embedded link.

Another aspect of the invention involves a computer data structure that includes an email message with an embedded link. The embedded link contains event information corresponding to multiple parameters for an event described in the email message. The embedded link is configured, upon activation, to initiate generation of an electronic calendar entry form with multiple fields. A plurality of the multiple fields contain event information from the embedded link.

Another aspect of the invention involves a system that includes at least one server. The at least one server is configured to receive an email message for a user; determine a plurality of parameters for an event described in the email message; and send the email message, along with an embedded link, to a computer associated with the user. The embedded link contains event information corresponding to at least some of the determined parameters for the event. In response to activation of the embedded link, the server is configured to send an electronic calendar entry form with multiple fields to the computer associated with the user. A plurality of the multiple fields contain event information from the embedded link.

Another aspect of the invention involves a client computer that is configured to receive an email message, with an embedded link, from a remote computer. The embedded link contains event information corresponding to multiple parameters for an event described in the email message. In response to activation of the embedded link, the client computer is configured to receive and display an electronic calendar entry form with multiple fields. A plurality of the multiple fields contain event information from the embedded link.

Another aspect of the invention involves a computer-program product that includes a computer readable storage medium and a computer program mechanism embedded in the computer readable storage medium. The computer program mechanism includes instructions, which when executed by a server computer, cause the server computer to receive an email message for a user; determine a plurality of parameters for an event described in the email message; and send the email message, along with an embedded link, to a computer associated with the user. The embedded link contains event information corresponding to at least some of the determined parameters for the event. In response to activation of the embedded link, the instructions cause the server to send an electronic calendar entry form with multiple fields to the computer associated with the user. A plurality of the multiple fields contain event information from the embedded link.

Another aspect of the invention involves a computer-program product that includes a computer readable storage medium and a computer program mechanism embedded in the computer readable storage medium. The computer program mechanism includes instructions, which when executed by a client computer, cause the client computer to receive an email message, with an embedded link, from a remote computer. The embedded link contains event information corresponding to multiple parameters for an event described in the email message. In response to activation of the embedded link, the instructions cause the client computer to receive and display an electronic calendar entry form with multiple fields. A plurality of the multiple fields contain event information from the embedded link.

Another aspect of the invention involves a server computer that includes means for receiving an email message for a user; means for determining a plurality of parameters for an event described in the email message; and means for sending the email message, along with an embedded link, to a computer associated with the user. The embedded link contains event information corresponding to at least some of the determined parameters for the event. In response to activation of the embedded link, the server includes means for sending an electronic calendar entry form with multiple fields to the computer associated with the user. A plurality of the multiple fields contain event information from the embedded link.

Another aspect of the invention involves a client computer that includes means for receiving an email message, with an embedded link, from a remote computer. The embedded link contains event information corresponding to multiple parameters for an event described in the email message. In response to activation of the embedded link, the client computer includes means for receiving and means for displaying an electronic calendar entry form with multiple fields. A plurality of the multiple fields contain event information from the embedded link.

Thus, these methods, systems, GUIs, and data structures provide new, more efficient ways to create electronic calendar entries from email messages.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

DETAILED DESCRIPTION

Methods, systems, GUIs, and data structures for creating electronic calendar entries are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

Figure 1:
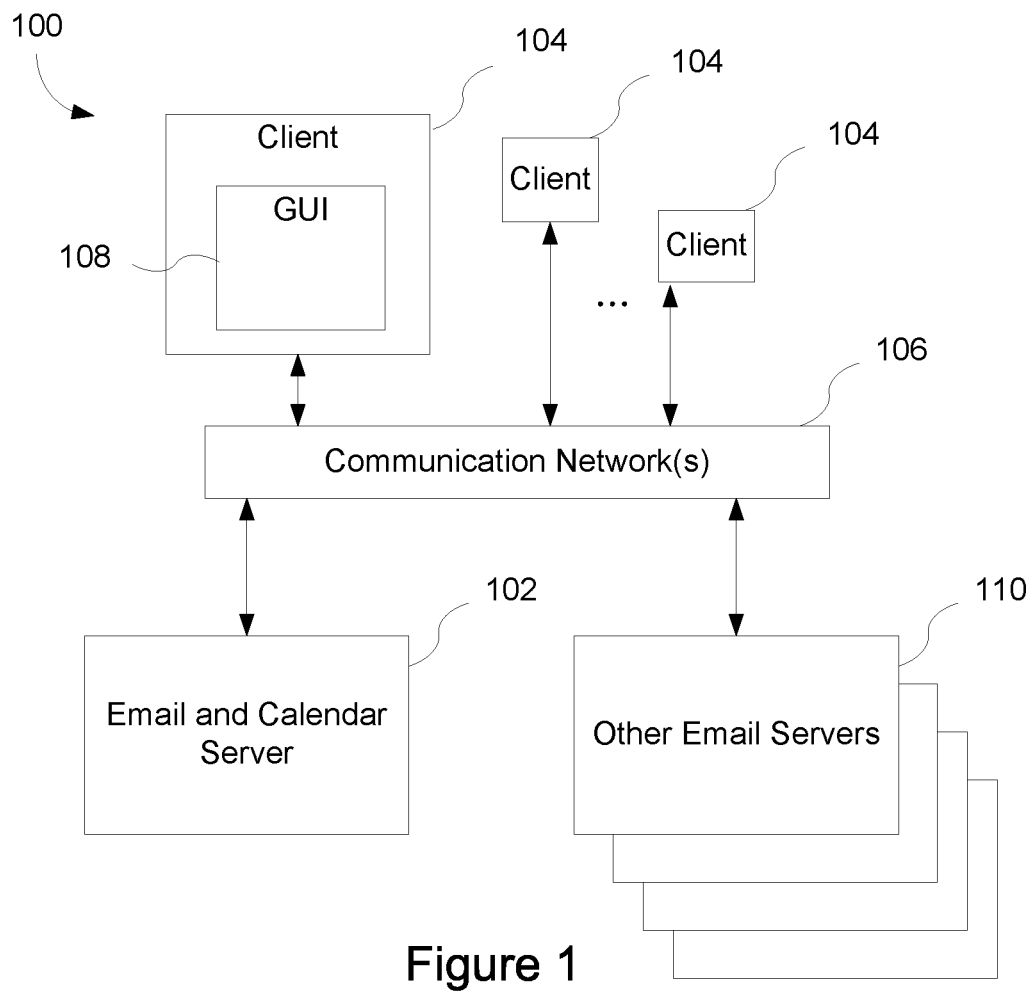
FIG. 1 is a block diagram illustrating an exemplary distributed computer system in accordance with one embodiment of the invention.

FIG. 1 is a block diagram illustrating an exemplary distributed computer system 100 according to one embodiment of the invention. FIG. 1 shows various functional components that will be referred to in the detailed discussion that follows. This system includes client computers 104, email and calendar server 102, other email servers 110, and communication network(s) 106 for interconnecting these components.

Client computer 104 can be any of a number of computing devices (e.g., an internet kiosk, personal digital assistant, cell phone, desktop computer, or laptop computer) used to enable the activities described below. Client 104 includes graphical user interface (GUI) 108.

Figure 2:
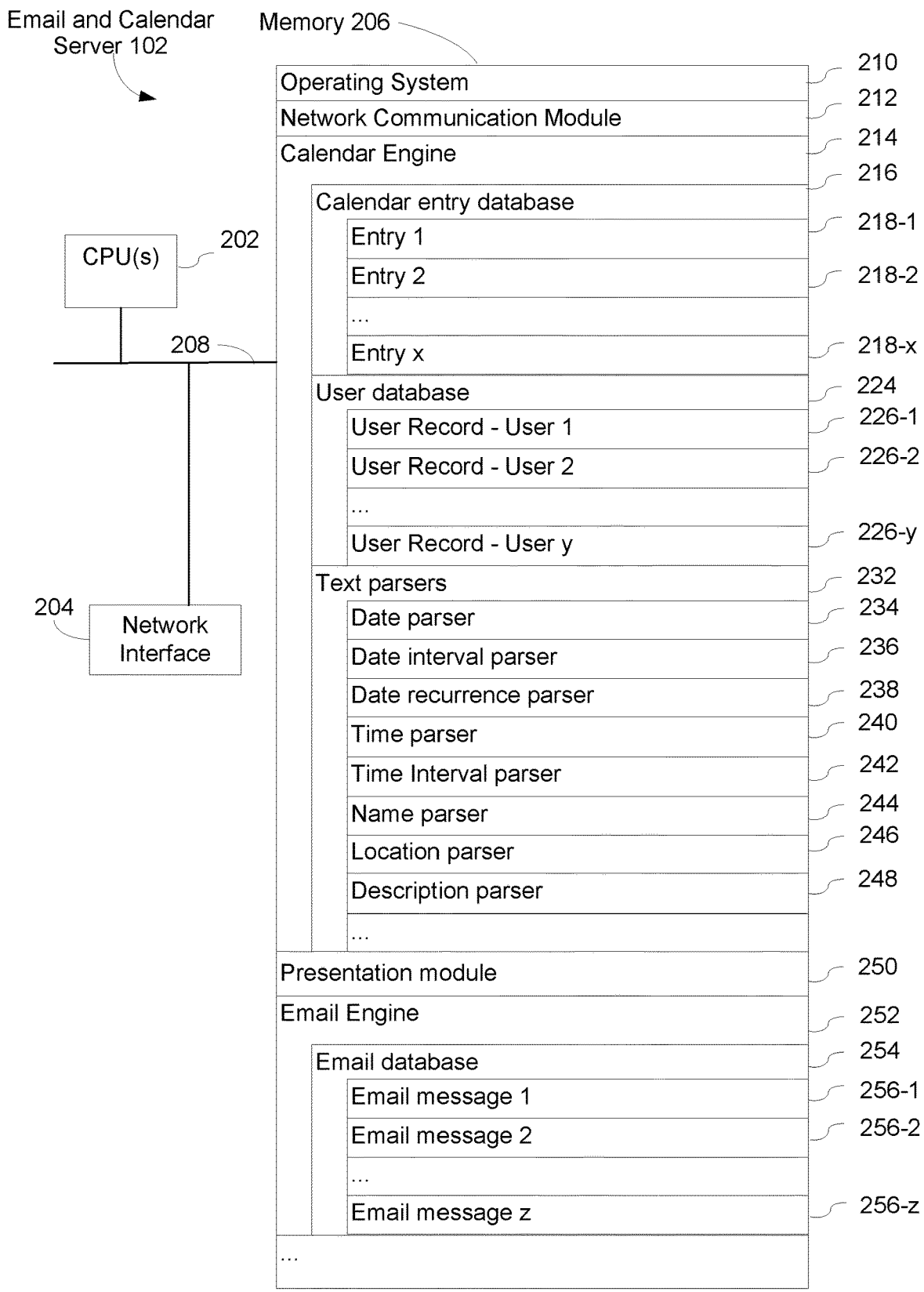
FIG. 2 is a block diagram illustrating an email and calendar server in accordance with one embodiment of the present invention.

FIG. 2 is a block diagram illustrating email and calendar server 102 in accordance with one embodiment of the present invention. Email and calendar server 102 typically includes one or more processing units (CPUs) 202, one or more network or other communications interfaces 204, memory 206, and one or more communication buses 208 for interconnecting these components. The communication buses 208 may include circuitry (sometimes called a chipset) that interconnects and controls communications between system components. Email and calendar server 102 may optionally include a graphical user interface (not shown), which typically includes a display device, a keyboard, and a mouse or other pointing device. Memory 206 may include high-speed random access memory and may also include non-volatile memory, such as one or more magnetic or optical storage disks. Memory 206 may optionally include mass storage that is remotely located from CPUs 202. Memory 206 may store the following programs, modules and data structures, or a subset or superset thereof:

Operating System 210 that includes procedures for handling various basic system services and for performing hardware dependent tasks;

Network Communication Module (or instructions) 212 that is used for connecting email and calendar server 102 to other computers (e.g., clients 104 and other email servers 110) via the one or more communications Network Interfaces 204 (wired or wireless) and one or more communications networks 106 (FIG. 1), such as the Internet, other wide area networks, local area networks, metropolitan area networks, and so on;

Calendar Engine 214 that receives calendar-related requests from and provides responses to clients 104;

Presentation module 250 that formats the results from Calendar Engine 214 and/or Email Engine 252 for display; and Email Engine 252 that receives email for users from other email servers (e.g., 110), sends email from users to other email servers (e.g., 110), and receives email-related requests from and provides responses to clients 104.

Calendar Engine 214 may include the following programs, modules and data structures, or a subset or superset thereof:

Calendar entry database 216 that stores records 218 for calendar entries (e.g., records 218-1, 218-2 through 218-x for Entries 1, 2 through x, respectively);

User database 224 that stores records 226 for users (e.g., records 226-1, 226-2, through 226-y for Users 1, 2, through y, respectively); and Text parsers 232 that extract information for use in various calendar fields from the email messages 256, such as:

Date parser 234 that extracts the date;

Date interval parser 236 that extracts anchored periods of time;

Date recurrence parser 238 that extracts repeated and/or cyclical temporal expressions (e.g., "Monday and Tuesday" and "every other Monday");

Time parser 240 that extracts start times and/or end times;

Time interval parser 242 that extracts the length of time of an event;

Name parser 244 that extracts names of people and organizations;

Location parser 246 that extracts addresses, named venues, room numbers, and other location-related data; and Description parser 248 that extracts event titles and/or descriptions, such as "meeting" or "picnic" or "ABC Flight 3412."

In some embodiments, the temporal parsers 234, 236, 238, 240, and 242 are combined into a single temporal expression parser. Temporal parsing is described below. The other types of parsing are performed in an analogous manner.

In some embodiments, temporal expression parsing has three logical steps: (1) recognition, also known as syntactic parsing; (2) decoding, or semantic analysis; and (3) abductive inference, or resolution of ambiguous and/or underspecified expressions. The input data for parsing is a text string, which may include zero, one, or more temporal expressions, and the output information is a temporal expression representation that may include partial or complete date/times, date/time intervals (which include begin and end points), and/or recurrences (e.g., carrying the meaning of "every Wednesday").

In some embodiments, recognition is accomplished using a regular expression matching engine and a grammar that provides tags for the matches. For example, the expression "9/18/05" can produce matches for MONTH "9", DAY "18" and YEAR "05". In some embodiments, to interpret this text in European format, day/month/year, a different grammar is used, with the grammar selection controlled through meta information passed in with each parser invocation.

In some embodiments, decoding consists of translating the matching strings into a temporal expression representation using the tags to guide the decoding and assignment. In some embodiments, the strings are converted into numbers and assigned to a single date expression with month, year, and day fields. Heuristic rules may be applied, e.g., to interpret "05" as the year 2005. Indexical expressions, e.g. "today", and relative expressions, e.g., "next Wednesday and the Thursday following" are also interpreted at this stage, using date/time reference information passed in as part of the parser invocation.

In some embodiments, abductive inference rules are used to add information and/or apply constraints to the decoded expression. For example, "9/18" would be interpreted as a month and day in the current year; hour and time zone would be left unspecified. Abductive inference is used to infer AM/PM when this information is not in the text string, e.g. "from 11 to 9" is interpreted as 11 AM to 9 PM, on a single day. In some embodiments, this stage also handles resolution of temporal expressions that are not contiguous. For example, a date could appear at one place in the text, and a time or time range elsewhere: "lecture this Friday in Tammany Hall, from 11 to 12." This text is resolved to a single interval expression, where the begin date and end date correspond to the coming Friday, the begin time is 11 AM and the end time is 12 noon.

Email Engine 252 may include the following programs, modules and data structures, or a subset or superset thereof:

Email database 254 that stores records for email messages for users (e.g., records 256-1, 256-2 through 256-z for email messages 1, 2 through z, respectively).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Although FIG. 2 shows email and calendar server 102 as a number of discrete items, FIG. 2 is intended more as a functional description of the various features which may be present in server 102 rather than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers in email and calendar server 102 and how features are allocated among them will vary from one implementation to another, and may depend in part on the amount of data traffic that the system must handle during peak usage periods as well as during average usage periods.

Figure 3A:
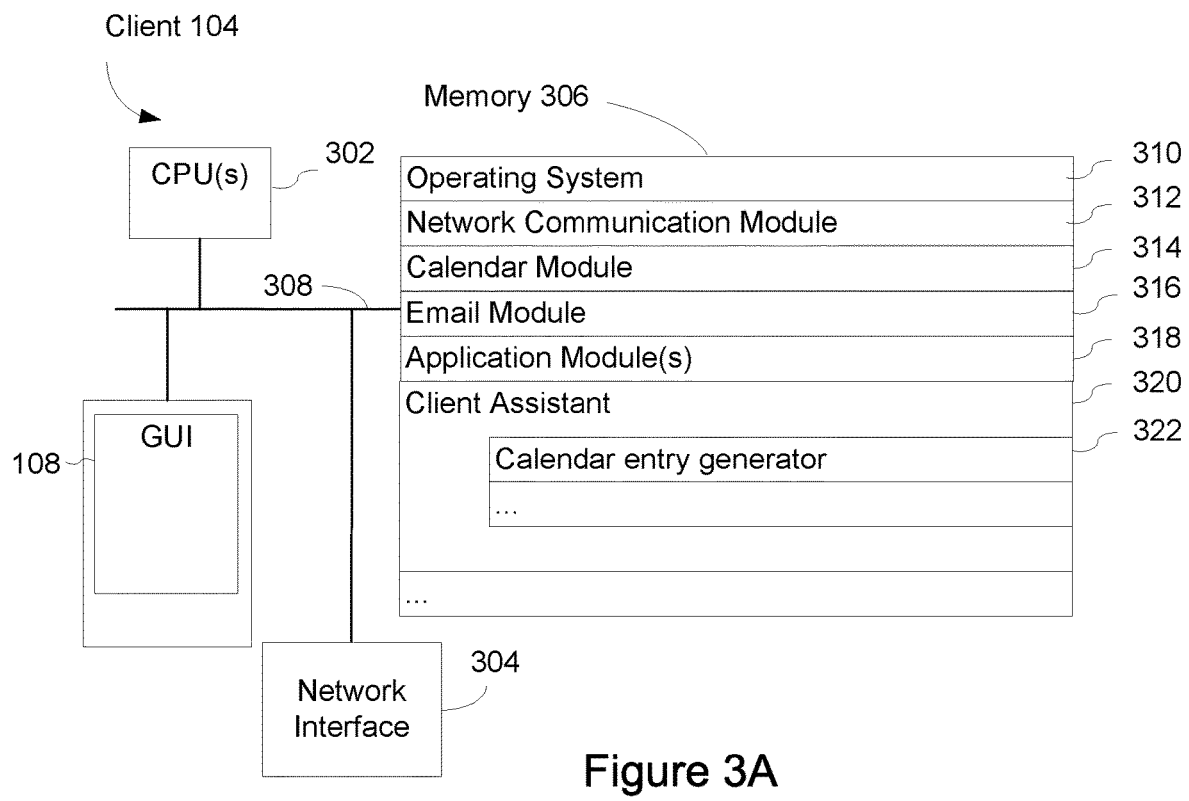
FIGS. 3A and 3B are block diagrams illustrating two exemplary clients.
Figure 3B:
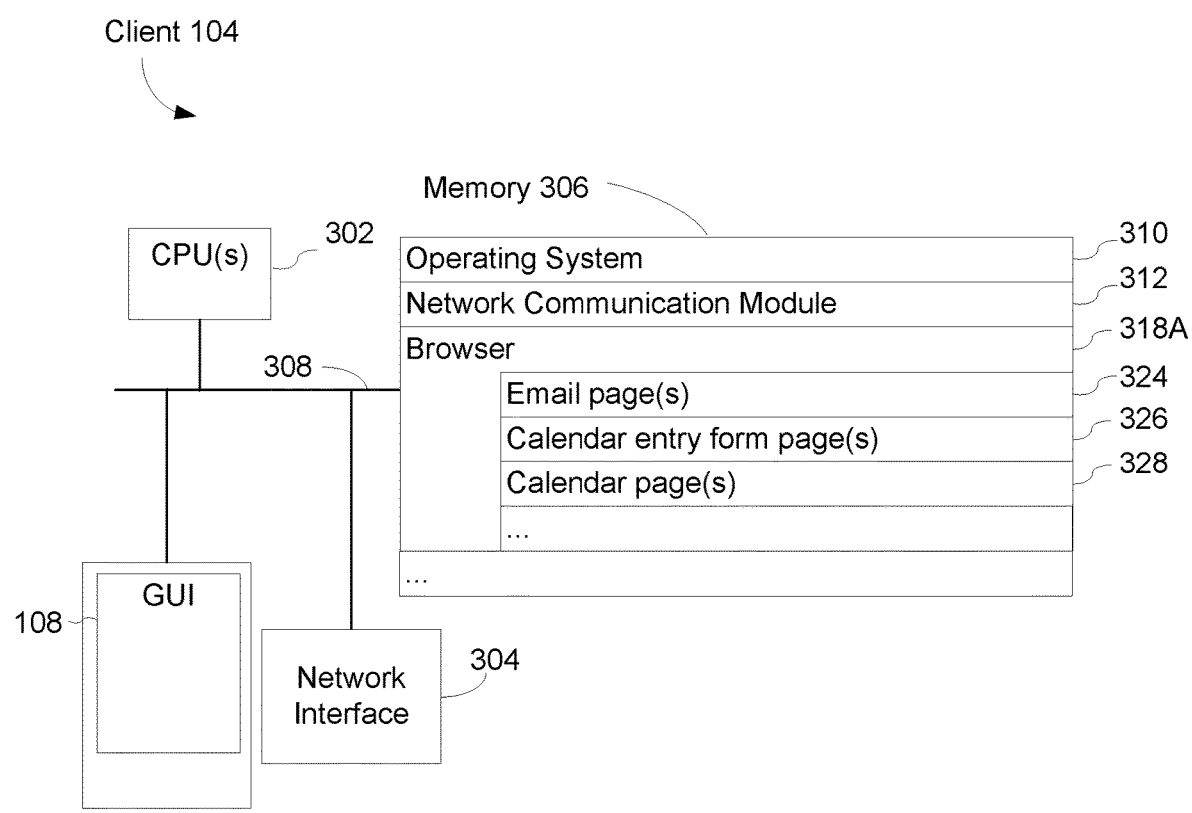

FIGS. 3A and 3B are block diagrams illustrating two exemplary clients. As noted above, client 104 includes graphical user interface (GUI) 108. Client 104 typically includes one or more processing units (CPUs) 302, one or more network or other communications interfaces 304, memory 306, and one or more communication buses 308 for interconnecting these components. The communication buses 308 may include circuitry (sometimes called a chipset) that interconnects and controls communications between system components. Memory 306 may include high-speed random access memory and may also include non-volatile memory, such as one or more magnetic or optical storage disks. Memory 306 may store the following programs, modules and data structures, or a subset or superset thereof:

- Operating System 310 that includes procedures for handling various basic system services and for performing hardware dependent tasks;
- Network Communication Module (or instructions) 312 that is used for connecting client 104 to other computers (e.g., email and calendar server 102 and other clients 104) via the one or more communications Network Interfaces 304 (wired or wireless) and one or more communication networks 106 (FIG. 1), such as the Internet, other wide area networks, local area networks, metropolitan area networks, and so on;
- Calendar Module 314, for receiving calendar-related input from a computer user (e.g., a request to create an electronic calendar entry and an email message for parsing) and for formatting the calendar data for display in GUI 108;
- Email Module 316, for receiving email-related input from a computer user (e.g., requests to create, send and view emails) and for formatting the emails for display in GUI 108;
- Application Module(s) 318 for other applications (e.g., an Internet or web browser); and
- Client Assistant 320, which handles data formatting and/or management tasks, at least some of which could also be handled by Calendar Engine 214 and/or Email Engine 252 (FIG. 2, email and calendar server).

As illustrated schematically in FIG. 3A, client 104 can incorporate modules, applications, and instructions for performing a variety of calendar-related processing tasks (e.g., calendar-entry generator 322), at least some of which could be handled by Calendar Engine 214 in server 102 instead. Alternatively, in some embodiments, client 104 can contain less functionality than shown in FIG. 3A. For instance, as shown in FIG. 3B, client 104 may be a "thin client" that includes an Internet or web browser 318A, but does not include email or calendar modules other than any execution code (e.g., programs or other executable instructions) that may be embedded in pages rendered by the web browser 318A, such as email pages 324, calendar entry form pages 326, and calendar pages 328. In thin client embodiments, essentially all email and calendar related processing other than user data input and email and calendar display are handled by the email and calendar server 102.

Figure 4:
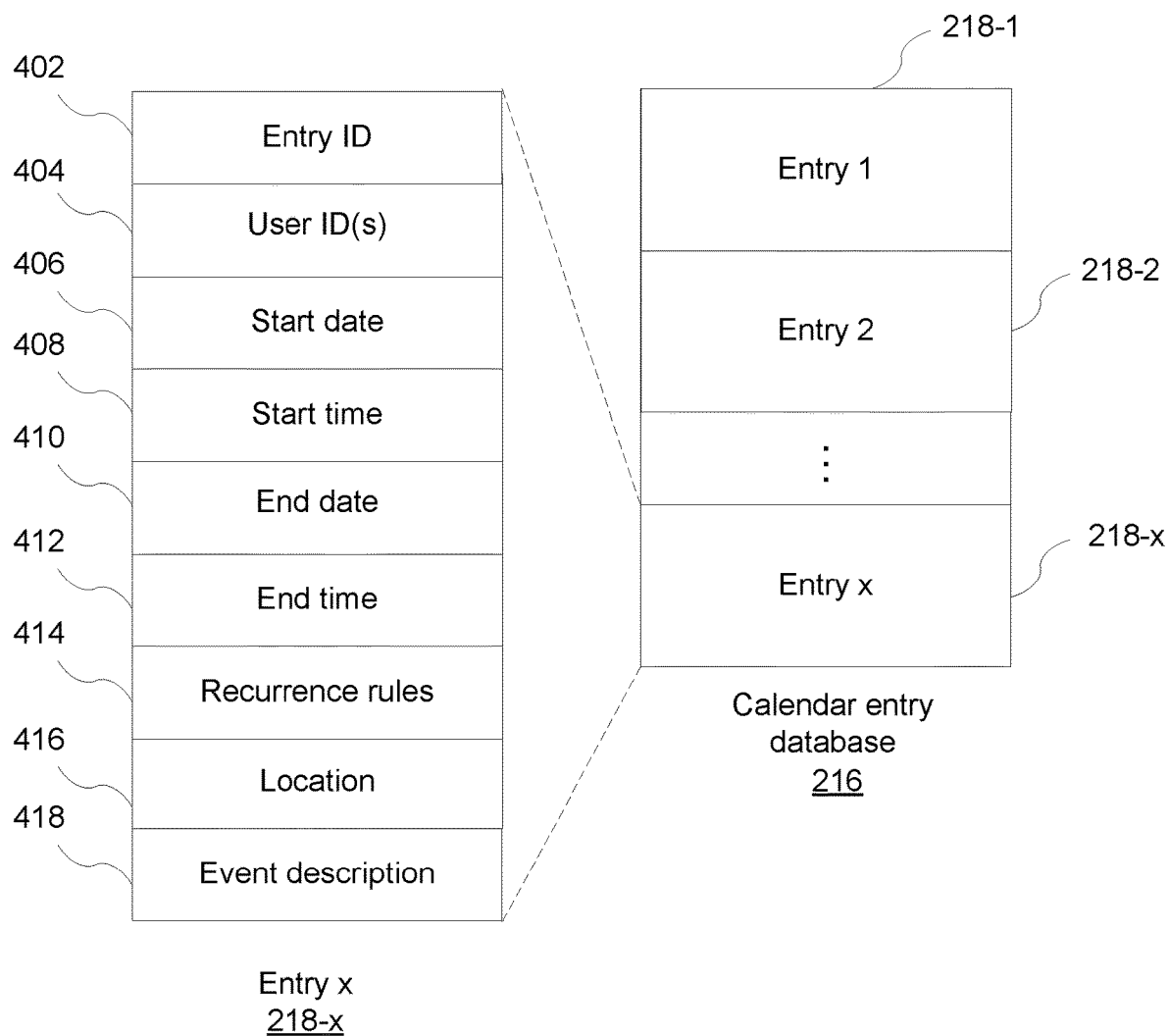
FIG. 4 is a block diagram illustrating an exemplary calendar entry database and an exemplary calendar entry record in accordance with one embodiment of the invention.

FIG. 4 is a block diagram illustrating an exemplary calendar entry database 216 and an exemplary calendar entry record 218 in accordance with one embodiment of the invention. Calendar entry database 216 stores calendar entry records 218, for example entry 1 (218-1) through entry x (218-x), where x may represent the number of entries.

A calendar entry (e.g., entry x 218-x) may include the following data, or a subset or superset thereof:

- Entry ID 402 that uniquely identifies a particular entry (e.g., an n-bit binary number);
- User ID(s) 404 that identifies the user(s) associated with the calendar entry (e.g., n-bit binary number(s) or e-mail addresses), such as an event organizer and attendees/guests/participants;
- Start date 406 of the event;
- Start time 408 of the event;
- End date 410 of the event;
- End time 412 of the event;
- Recurrence rules 414 for the event (e.g., only once, daily, weekly, every other week, etc.);
- Location 416 of the event; and
- Event description 418 (e.g., a title and/or description details).

In another embodiment, a separate calendar entry database is maintained for each user. In some embodiments, a calendar entry may further include a link to an email message. For example, when a calendar entry is generated based on information in an email message, the resulting calendar entry may include a link to the email message. In addition, the email message may contain a link to the calendar entry that was generated based on information in the email message.

Figure 5A:
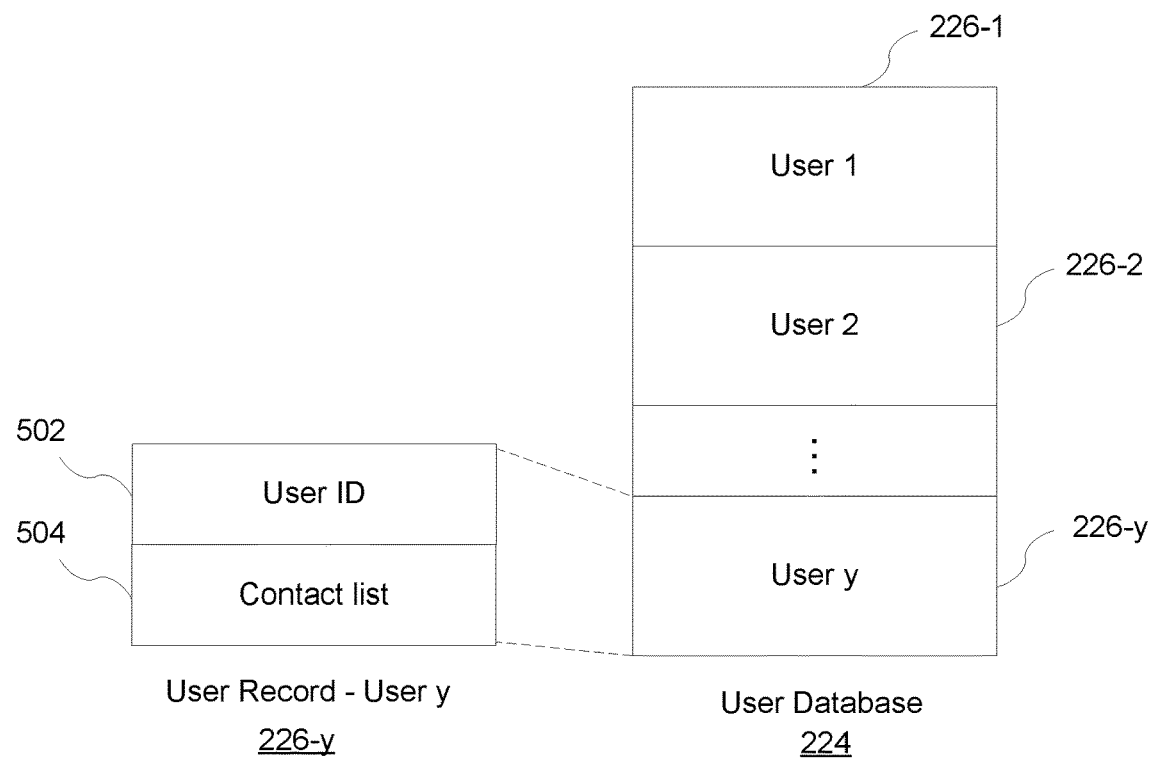
FIG. 5A is a block diagram illustrating an exemplary user database and an exemplary record for a particular user in accordance with one embodiment of the invention.

FIG. 5A is a block diagram illustrating an exemplary user database 224 and an exemplary user record 226 for a particular user in accordance with one embodiment of the invention. User Database 224 stores user records 226, for example user record (User 1) 226-1 through user record (User y) 226-y, where y may represent the number of users.

A user record (e.g., User Record 226-y) may include the following data, or a subset or superset thereof:

- User ID 502 that uniquely identifies a particular user (e.g., an n-bit binary number or an email address); and
- Contact list 504, which contains contact information for the user (i.e., information about other users or persons known to the user); alternatively, this field 504 of the user record 226 may contain a link to the user's contact list.

In embodiments in which the calendar server maintains a separate calendar entry database for each user, the user record 226 may include a pointer or link to the calendar entry database for that user.

Figure 5B:
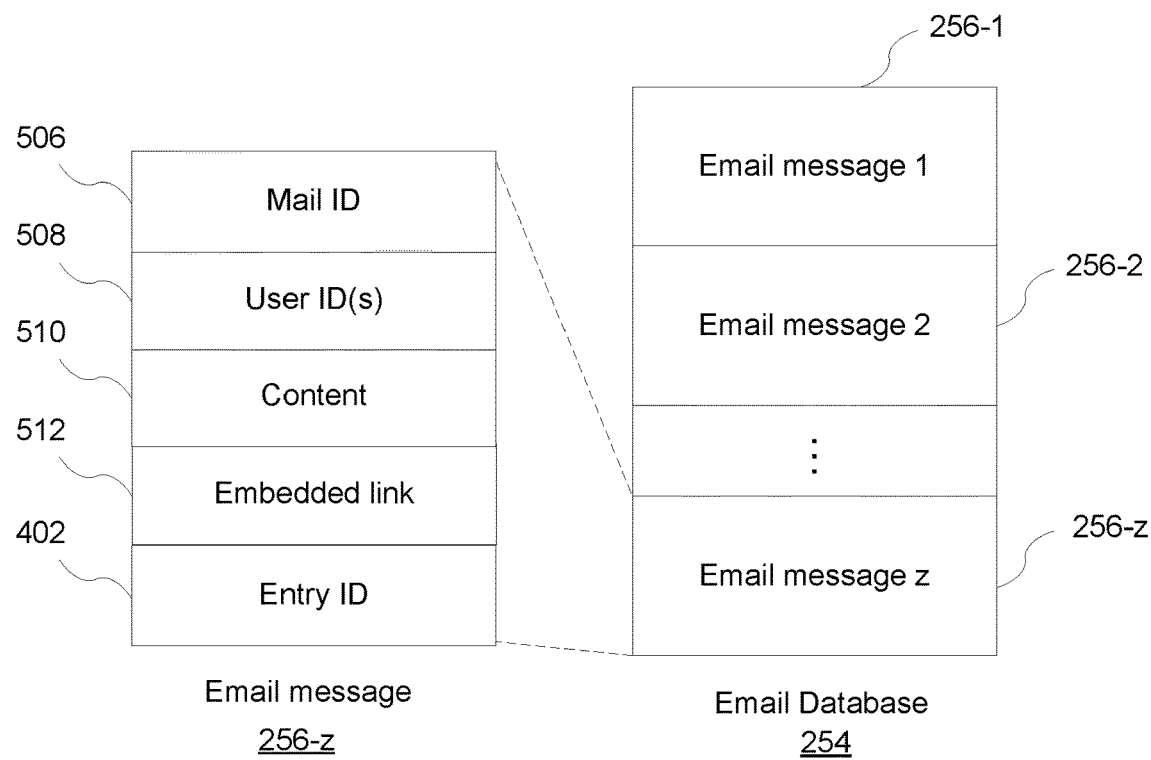
FIG. 5B is a block diagram illustrating an exemplary email database and an exemplary email message in accordance with one embodiment of the invention.

FIG. 5B is a block diagram illustrating an exemplary email database 254 and an exemplary email message 256 in accordance with one embodiment of the invention. Email database 254 stores email messages 256, for example message 256-1 (email message 1) through message 256-z (email message z), where z may represent the number of messages.

An email message (e.g., message 256-z) may include the following data, or a subset or superset thereof:

- Mail ID 506 that uniquely identifies a particular message (e.g., an n-bit binary number);
- User ID(s) 502 that uniquely identify particular users that the message is being sent to (e.g., n-bit binary numbers or email addresses);
- Content 510 (e.g., text and images);
- Embedded link 512 (i.e., an "event creation link") that contains event information (if any) corresponding to at least some of the parameters determined for an event described in the email message; and
- Entry ID 402 for a corresponding calendar entry, if any.

Entry ID 402 is null or empty if there isn't a calendar entry that corresponds to the email message. Similarly, embedded link 512 is null or empty if no event information is identified in the email message by the text parsers 232. In some embodiments, the event parameters are determined just after the user requests the corresponding email message 256 (i.e., the event parameters are determined "on the fly" in response to the user's request for the corresponding email message)

and the embedded link 512 is not stored in the corresponding email message 256 in email database 254 before the message is sent to the client.

Figure 6A:
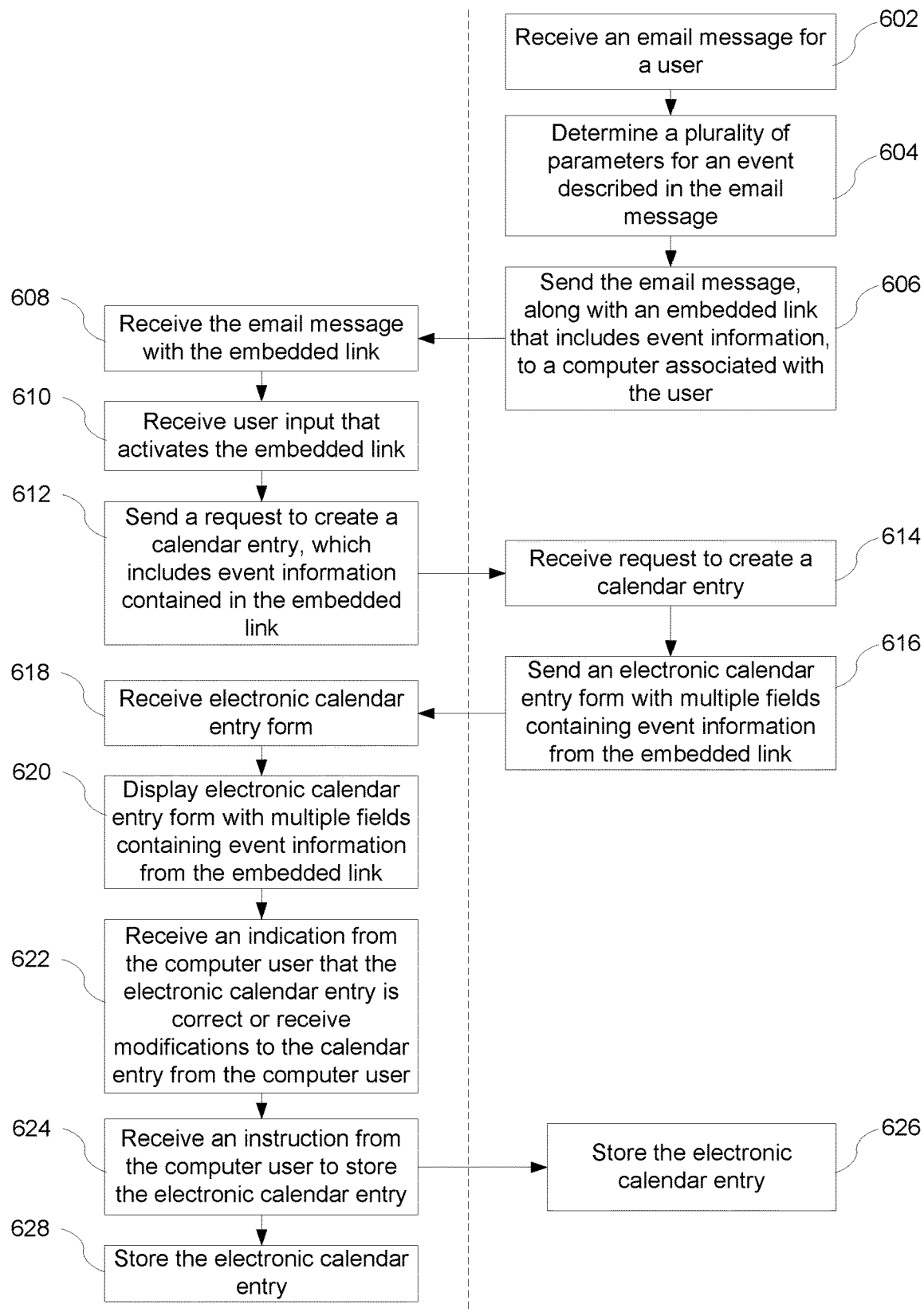
FIGS. 6A and 6B are flowcharts representing a method of creating electronic calendar entries from email messages in accordance with one embodiment of the invention.
Figure 6B:
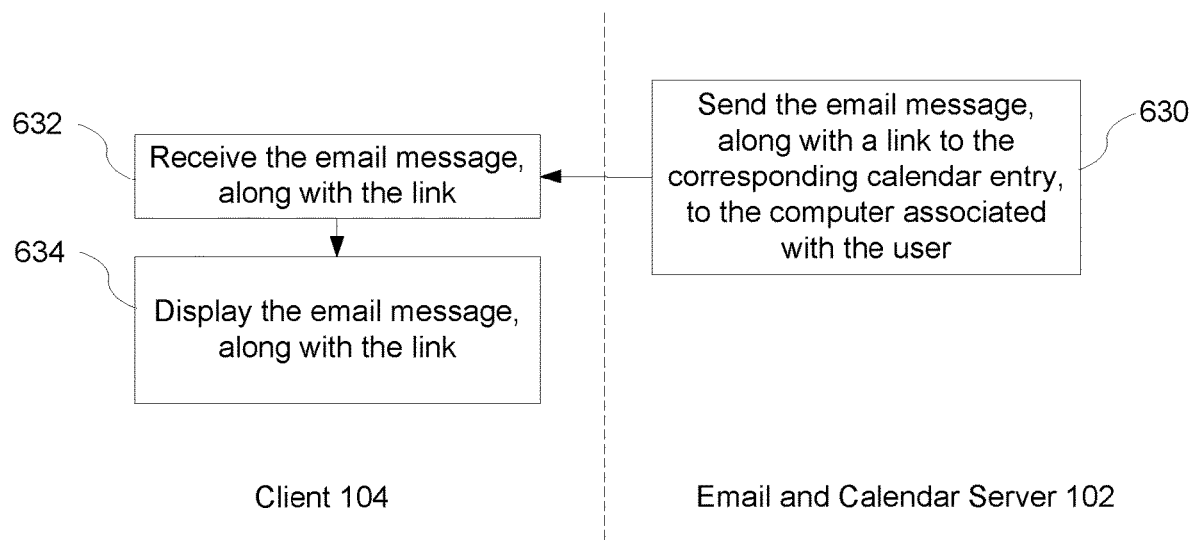
Figure 7A:
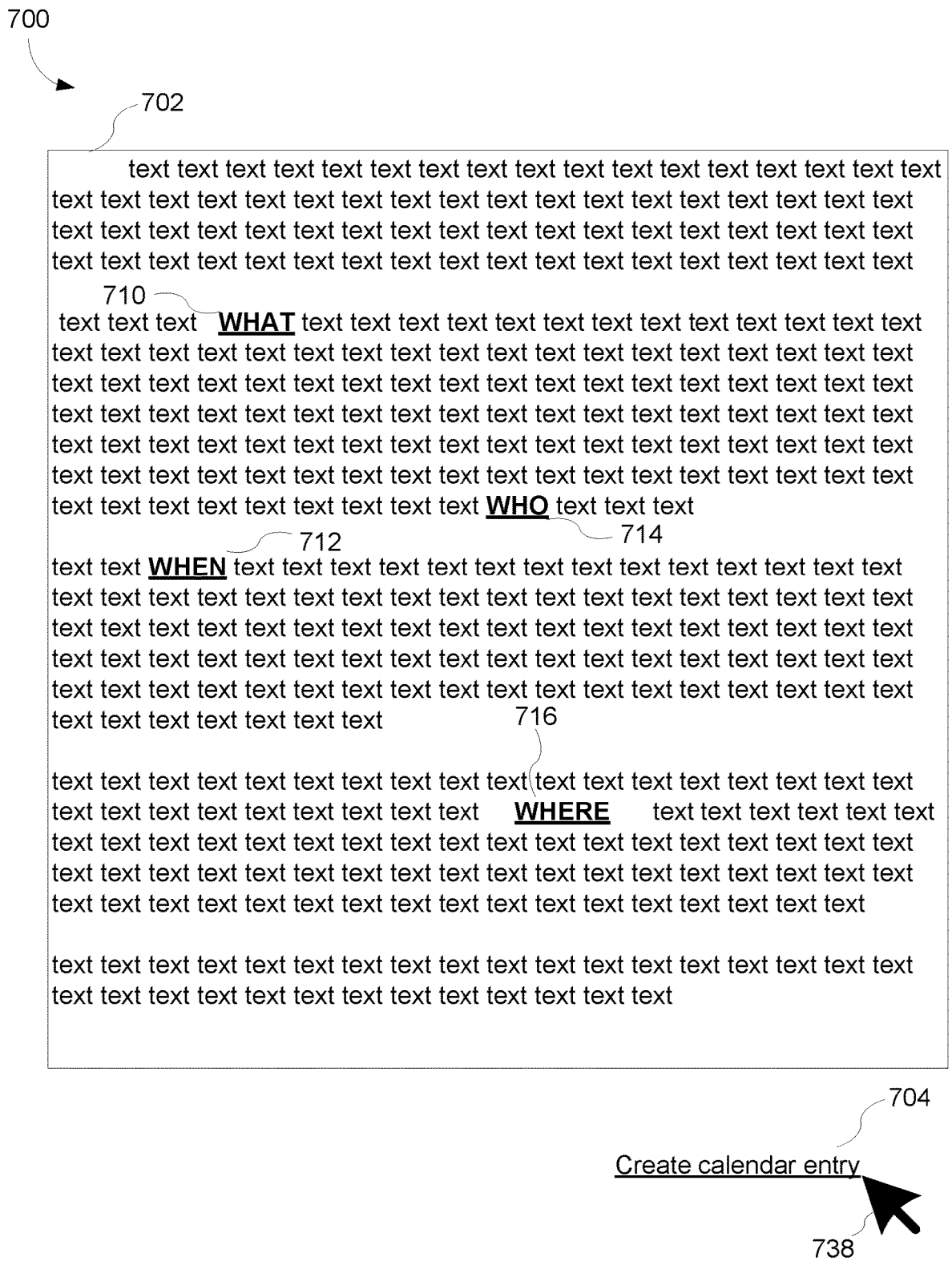
FIGS. 7A-7E are schematic screen shots of exemplary graphical user interfaces for creating an electronic calendar entry from an email message in accordance with embodiments of the present invention.
Figure 7B:
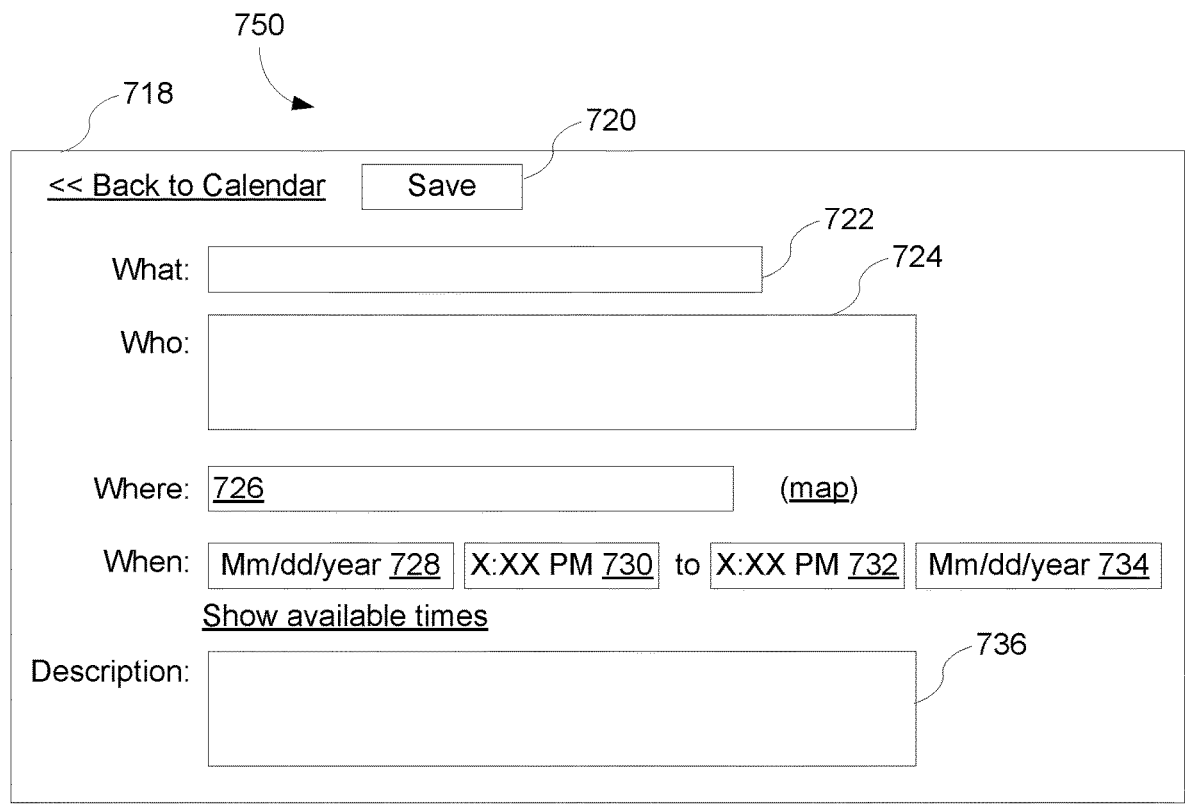
Figure 7C:
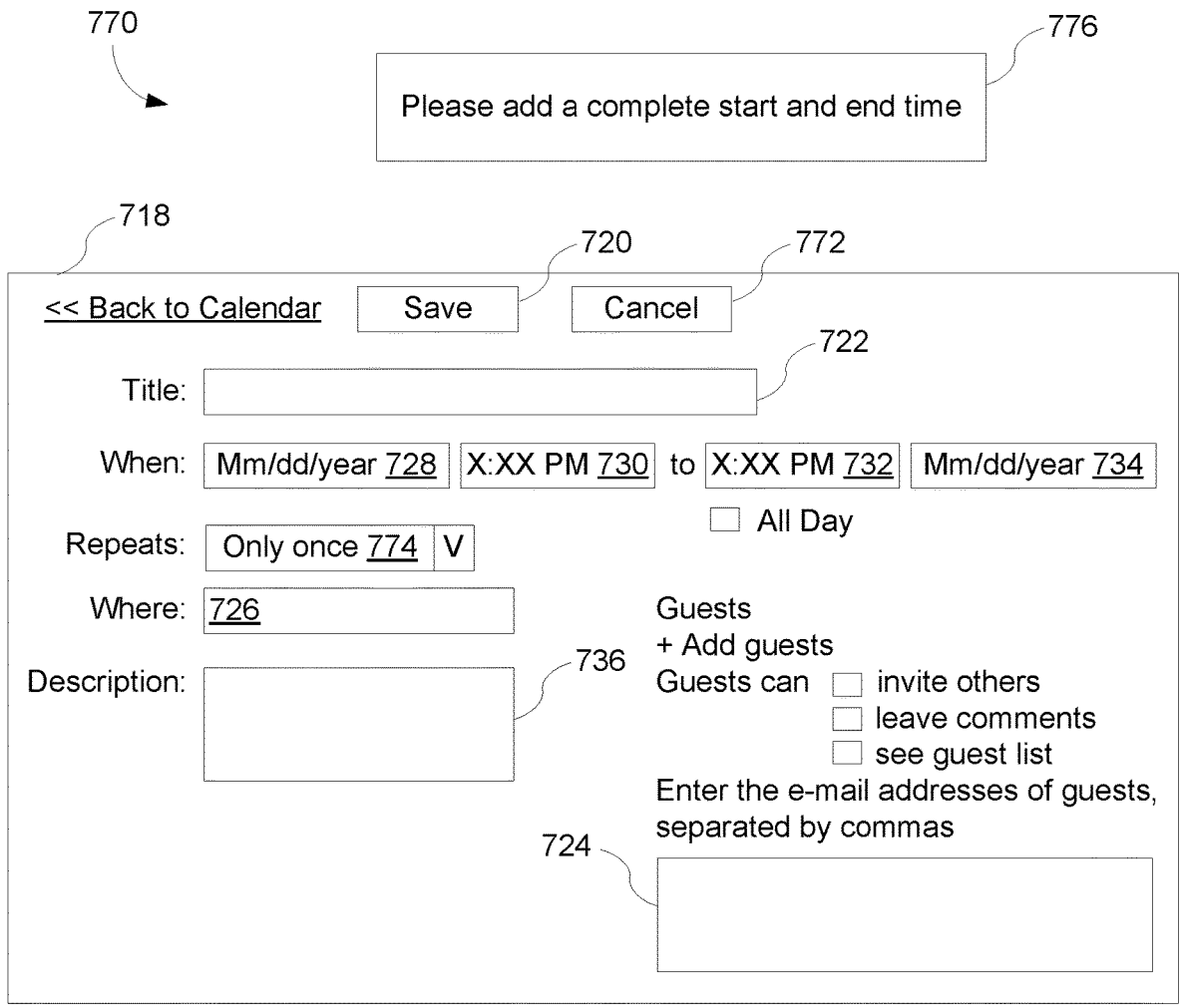
Figure 7D:
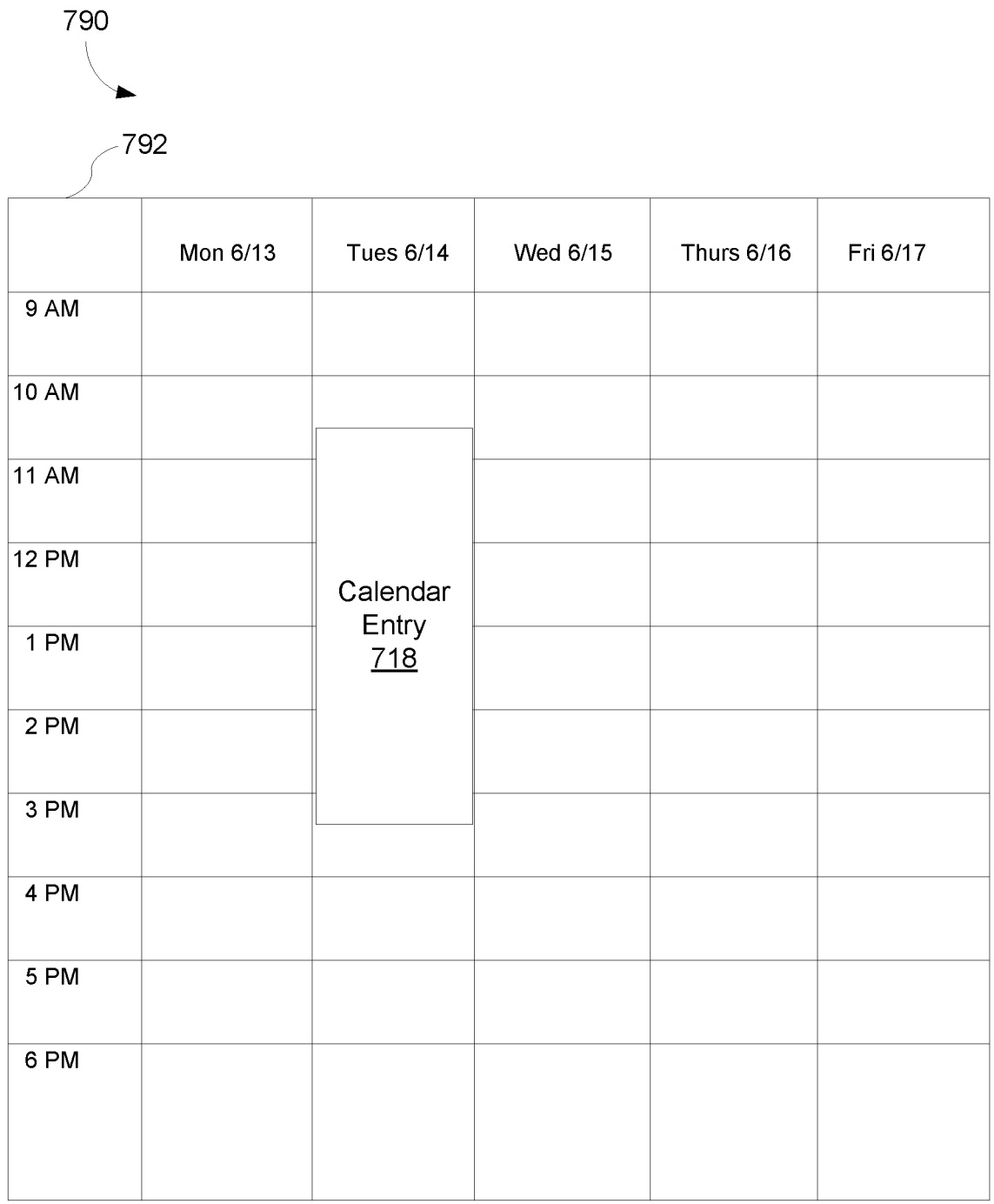
Figure 7E:

FIGS. 6A and 6B are flowcharts representing a method of creating electronic calendar entries from email messages in accordance with one embodiment of the present invention. FIGS. 6A and 6B show processes performed by email and calendar server 102 and client 104. It will be appreciated by those of ordinary skill in the art that one or more of the acts described may be performed by hardware, software, or a combination thereof, as may be embodied in one or more computing systems. In some embodiments, portions of the processes performed by server 102 can be performed by client 104 using components analogous to those shown for server 102 in FIG. 2. FIGS. 6A and 6B are further described below.

FIGS. 7A-7E are schematic screen shots of exemplary graphical user interfaces for creating an electronic calendar entry from an email message in accordance with embodiments of the present invention. In some embodiments, GUI 700 (FIG. 7A) includes the following elements, or a subset or superset thereof:
  Email message 702, which will typically include information for multiple fields in calendar entry 718 (or 218) (e.g., information explaining what an event is about, who is invited, when the event will occur, and/or where the event will occur, which information is represented schematically in message 702 as what 710, who 714, when 712, and where 716, respectively);
  Embedded link 704 (which corresponds to embedded link 512 (i.e., an "event creation link") in email message 256) that initiates creation of an electronic calendar entry 218 (FIG. 2)/718 (FIGS. 7B and 7C) that includes multiple data fields (e.g., a subset of fields 406-418 (FIG. 4), fields 722-736 (FIG. 7B), or fields 722-736 and 774 (FIG. 7C)), at least some of which are automatically populated with information derived from data (e.g., text and metadata) in email message 702 that is contained in the embedded link; and
  Cursor 738.

GUI 700 (FIG. 7A) visually displays an email message 256 (see FIG. 5B) with an embedded link 512 (visually represented by link 704). The embedded link 512 contains event information corresponding to multiple parameters for an event described in the email message 256. In some embodiments, the multiple parameters are parameters that have been determined by a remote computer (e.g., server 102) analyzing the email message 256 without human intervention. The embedded link 512 is configured, upon activation, to initiate generation of an electronic calendar entry form (e.g., 750 in FIG. 7B or 770 in FIG. 7C) with multiple fields. A plurality of the multiple fields contain event information from the embedded link 512.

In some embodiments, GUI 750 (FIG. 7B) is an electronic calendar entry form that includes the following elements, or a subset or superset thereof:
  Calendar entry 718, with multiple fields such as:
    What field 722 that briefly describes the event;
    Who field 724 that lists potential event participants;
    Where field 726 that provides the location of the event;
    Start date field 728;
    Start time field 730;
    End time field 732;
    End date field 734;
    Description field 736 that provides additional information about the event; and
    Save icon 720 that initiates storage of the calendar entry 718 (or 218) in server 102 and/or client 104.

As used herein, an icon is a visual element in a GUI, such as a button or menu item, that initiates a command or program when activated (e.g., clicked on).

In some embodiments, GUI 770 (FIG. 7C) is an electronic calendar entry form that includes the following elements, or a subset or superset thereof:
  Calendar entry 718, with multiple fields such as:
    Title field 722 that briefly describes the event;
    Guests field 724 that lists potential event participants;
    Where field 726, described above;
    Start date field 728;
    Start time field 730;
    End time field 732;
    End date field 734;
    Description field 736, described above;
    Save icon 720 that initiates storage of the calendar entry 718 (or 218) in server 102 and/or client 104.
    Cancel icon 772 that cancels creation of the calendar entry 718;
    Recurrence field 774 that describes the recurrence rule for the event, if any; and
    Instruction box 776 that requests missing information in calendar entry 718.

It is noted that in some embodiments, the names of one or more of the above-mentioned fields may differ from the names used above. For instance, the What field 722 may be called the Subject field or the Title field; the Who field 724 may be called the Participants or Guests field.

In some embodiments, GUI 790 (FIG. 7D) includes the following elements, or a subset or superset thereof:
  Electronic calendar frame 792, which displays a daily, weekly, monthly, or yearly calendar, or a portion thereof; and
  Calendar entry 718, which may be in a condensed form.

In some embodiments, GUI 795 (FIG. 7E) includes the following elements, or a subset or superset thereof:
  Email message 702, described above;
  View calendar entry link 798 that replaces embedded link 704 after the corresponding calendar entry has been made; and
  Cursor 738.

User selection or activation of the link 798 causes a web page or form with the corresponding calendar entry to be downloaded to and displayed at the client 104.

Email and calendar server 102 receives (602) an email message 256 for a user (e.g., from one of the other email servers 110).

Server 102 determines (604) (e.g., using text parsers 232) a plurality of parameters for an event described in the email message 256. In some embodiments, text parsers 232 identify or infer information (e.g., 710-716) for multiple fields (e.g., a subset of fields 406-418 or 722-736) in electronic calendar entry 718 or 218. Examples of inferred information (values) include, without limitation: inferring absolute dates and times based on relative dates and times in the "when" information 712 (e.g., inferring tomorrow's date if the "when" information 712 is "tomorrow"); inferring a person's full name by matching the "who" information 714 to a nickname in the user's contact list 504; inferring that a "birthday" lasts all day; and inferring from metadata in an email message that indicates that the message was created on Oct. 3, 2005 that "today" means Oct. 3, 2005, even if the message is being viewed at a later date. Thus, for an email message "lunch with fred at 1 tomorrow", "1" is inferred to be 1 PM in the local time zone; "tomorrow" is translated into the date of the following day; and "fred" is identified and expanded to an e-mail address based on the contact list 504 of the calendar user.

In some embodiments, the determined parameters for the event include a plurality of parameters in the set of parameters consisting of a date, a time, a location, a subject, and one or more attendees of the event.

As another example, consider the following exemplary email message 256, sent on Friday, Mar. 3, 2006:

"Subject: Pizza?
John,
Would you like to go out for dinner next Tuesday at 7 PM with Mike and Steve?
Jane"

For this message, the parameters determined by the text parsers 232 may be:
Start date: Mar. 7, 2006
Start time: 7:00 PM
End date: unspecified
End time: unspecified
Recurrence rules: Does not repeat
Location: unspecified
Title: dinner with Mike and Steve Server 102 sends (606) the email message 256, along with an embedded link 512, to a computer associated with the user (e.g., client 104). The embedded link 512 contains event information corresponding to at least some of the determined parameters for the event. In some embodiments, the determined parameters contained in the embedded link 512 include at least one date or time parameter and at least one parameter other than a date or time parameter of the event.

For the exemplary email message 256 given above, the embedded link 512 may be:
http://www.abc.com/calendar/
event?action=TEMPLATE&pprop=mailID:
xxxxxxxxxx&dates=20060307T190000/
????????T??????&text=dinner+with+Mike+and+Steve
where:
"www.abc.com/calendar" corresponds to the server 102 at abc.com that will send the partially filled in calendar entry form (template) to client 104 in response to activation of the link;
"xxxxxxxxxx" is a unique identifier (mail ID) for the corresponding email message 256;
"20060307" is event information (e.g., in YearMMDD format) corresponding to the start date parameter determined by date parser 234, which will be formatted and displayed in start date field 728 in calendar entry 718;
"190000" is event information (e.g., in 24-hour HHMMSS format) corresponding to the start time parameter determined by time parser 240, which will be formatted and displayed in start time field 730 in calendar entry 718;
"????????T??????" is unspecified event information corresponding to the end date and time parameters left undetermined by date parser 234 and time parser 240, respectively, which will be formatted and displayed in the end date 734 and end time 732 fields in calendar entry 718; and
"dinner+with+Mike+and+Steve" is event information corresponding to the title parameters determined by description parser 248, which will be formatted and displayed in title field 722 in calendar entry 718.

As another example, consider the following exemplary email message 256:
"It is my pleasure to announce the visit of Dr. Martin Hellman, Professor Emeritus of Electrical Engineering at Stanford University. Please sign up . . . to meet with him and let me know if you'd like to join us for lunch. He would be very happy to meet with people on the subject of his talk, cryptography, or war/peace/ethics of technology.
Title: The Wisdom of Foolishness
Date: Wednesday, Nov. 16, 2005
Time: 11 am-12 pm
Room: Tech Talk Building 42
Abstract:
It is humiliating to appear foolish, especially in academia. So it is somewhat paradoxical that I got to be a full professor by doing work almost all my colleagues told me was crazy. When I first started working in cryptography in the early 70's, I constantly heard the warning "How can you hope to discover anything new when NSA has been working in the area for decades with a huge budget? And, if you do anything good, they'll classify it." While both arguments were valid and came back to haunt me, in hindsight it was very wise to be foolish."

For this message, the parameters determined by the text parsers 232 may be:
Start date: Nov. 16, 2005
Start time: 11:00 AM
End date: Nov. 16, 2005
End time: 12:00 PM
Recurrence rules: Does not repeat
Location: Tech Talk Building 42
Title: The Wisdom of Foolishness
Event description: It is humiliating to appear foolish, especially in academia.

For this exemplary email message 256, the embedded link 512 may be:
www.abc.com/calendar/
event?action=TEMPLATE&pprop=mailID:
&dates=20051116T110000/
20051116T120000&text=The+Wisdom+of+
Foolishness&details=It+is+humiliating+to+appear+
foolish,+especially+in+academia . . . &location=Tech+
Talk+Building+42
where:
"www.abc.com/calendar" corresponds to the server 102 at abc.com that will send the partially filled in calendar entry form (template) to client 104 in response to activation of the link;
"#####" is a unique identifier (mail ID) for the corresponding email message 256;
"20051116" is event information (e.g., in YearMMDD format) corresponding to the start date parameter determined by date parser 234, which will be formatted and displayed in start date field 728 in calendar entry 718;
"110000" is event information (e.g., in 24-hour HHMMSS format) corresponding to the start time parameter determined by time parser 240, which will be formatted and displayed in start time field 730 in calendar entry 718;
"20051116" is event information (e.g., in YearMMDD format) corresponding to the end date parameter determined by date parser 234, which will be formatted and displayed in end date field 734 in calendar entry 718;
"120000" is event information (e.g., in 24-hour HHMMSS format) corresponding to the end time parameter determined by time parser 240, which will be formatted and displayed in end time field 732 in calendar entry 718;
"The+Wisdom+of+Foolishness" is event information corresponding to the title parameters determined by description parser 248, which will be formatted and displayed in title field 722 in calendar entry 718;

"It+is+humiliating+to+appear+foolish,+especially+in+aca-demia." is event information corresponding to the description parameters determined by description parser 248, which will be formatted and displayed in description field 736 in calendar entry 718; and "Tech+Talk+Building+42" is event information corresponding to the location parameters determined by location parser 246, which will be formatted and displayed in where field 726 in calendar entry 718.

As another example, consider the following exemplary email message 256, sent on Wednesday, Oct. 26, 2005:
"I'm excited to go to the velo swap this weekend in SF.
http://www.veloswap.com/expo/
San Francisco Veloswap and Sports Expo
San Francisco, Calif.
every Saturday, 9:00 a.m.-5:00 p.m.
San Francisco Concourse Exhibition Center
Veloswap is the world's largest consumer bicycle and sports expo. It is THE place to see, swap, buy, and sell every imaginable bike, part, and accessory. Veloswap regularly draws thousands of enthusiasts to a fantastic celebration of everything in the world of bicycling and sport. Veloswap features new and used bicycles and equipment, cycling and sports clinics, family events, cycling celebrities, product sampling, and much, much more."

For this message, the parameters determined by the text parsers 232 may be:
Start date: Oct. 29, 2005
Start time: 9:00 AM
End date: Oct. 29, 2005
End time: 5:00 PM
Recurrence rules: Every Saturday
Title: San Francisco Veloswap and Sports Expo For this exemplary email message 256, the embedded link 512 may be:
www.abc.com/calendar/
  event?action=TEMPLATE&pprop=mailID:
  #####&text=San+Francisco+Veloswap+and+Sports+
  Expo&date=20051029T090000/
  20051029T170000&rrule=FREQ:WEEKLY;
  INTERVAL:1;BYDAY:6
where:
"www.abc.com/calendar" corresponds to the server 102 at abc.com that will send the partially filled in calendar entry form (template) to client 104 in response to activation of the link;

"#####" is a unique identifier (mail ID) for the corresponding email message 256;

"20051029" is event information (e.g., in YearMMDD format) corresponding to the start date parameter determined by date parser 234, which will be formatted and displayed in start date field 728 in calendar entry 718;

"090000" is event information (e.g., in 24-hour HHMMSS format) corresponding to the start time parameter determined by time parser 240, which will be formatted and displayed in start time field 730 in calendar entry 718;

"20051029" is event information (e.g., in YearMMDD format) corresponding to the end date parameter determined by date parser 234, which will be formatted and displayed in end date field 734 in calendar entry 718;

"170000" is event information (e.g., in 24-hour HHMMSS format) corresponding to the end time parameter determined by time parser 240, which will be formatted and displayed in end time field 732 in calendar entry 718;

"San+Francisco+Veloswap+and+Sports+Expo" is event information corresponding to the title parameters determined by description parser 248, which will be formatted and displayed in title field 722 in calendar entry 718; and "FREQ:WEEKLY;INTERVAL:1;BYDAY:6" is event information corresponding to the date recurrence parameters determined by date recurrence parser 238, which will be formatted and displayed in repeats field 774 in calendar entry 718.

As another example, consider the following exemplary email message 256:
"From: Ann Jones <ajones@xyz.com>
Date: Nov. 8, 2005 1:14 PM
Subject: Meetings with Tony Munro from Waterloo Co-op office, Tuesday, 11/15
To: bsmith@ xyz.com, cwilliams@ xyz.com, dpark@ xyz.com, ethompson@ xyz.com
Hello—Tony Munro from the co-op office will be in the Bay Area next week and will be visiting XYZ on Tuesday, November 15th. He would like to meet with all of you to check-in and see how things are going. I will schedule a group meeting for 1:00-2:00 pm on Tuesday and send you a calendar invite. He will also have "office hours" the rest of the afternoon, so please let me know if you would like me to schedule 1:1 time for you and Tony in addition to the group meeting."

For this message, the parameters determined by the text parsers 232 may be:
Start date: Nov. 15, 2005
Start time: 1:00 PM
End date: Nov. 15, 2005
End time: 2:00 PM
Recurrence rules: Does not repeat
Title: Meetings with Tony Munro
Who: bsmith@xyz.com, cwilliams@xyz.com, dpark@xyz.com, ethompson@xyz.com For this exemplary email message 256, the embedded link 512 may be:
www. abc.com/calendar/event?action=TEMPLATE&
  pprop=mailID:#####&text=Meetings+with+Tony+
  Munro&date=20051115T130000/
  20051115T140000&attendees=bsmith@xyz.com,
  cwilliams@xyz.com, dpark@xyz.com,
  ethompson@xyz.com
where:
"www.abc.com/calendar" corresponds to the server 102 at abc.com that will send the partially filled in calendar entry form (template) to client 104 in response to activation of the link;

"#####" is a unique identifier (mail ID) for the corresponding email message 256;

"20051115" is event information (e.g., in YearMMDD format) corresponding to the start date parameter determined by date parser 234, which will be formatted and displayed in start date field 728 in calendar entry 718;

"130000" is event information (e.g., in 24-hour HHMMSS format) corresponding to the start time parameter determined by time parser 240, which will be formatted and displayed in start time field 730 in calendar entry 718;

"20051115" is event information (e.g., in YearMMDD format) corresponding to the end date parameter determined by date parser 234, which will be formatted and displayed in end date field 734 in calendar entry 718;

"140000" is event information (e.g., in 24-hour HHMMSS format) corresponding to the end time parameter determined by time parser 240, which will be formatted and displayed in end time field 732 in calendar entry 718;

"Meetings+with+Tony+Munro" is event information corresponding to the title parameters determined by description parser 248, which will be formatted and displayed in title field 722 in calendar entry 718; and "bsmith@xyz.com, cwilliams@xyz.com, dpark@xyz.com, ethompson@xyz.com" is event information corresponding to email addresses and/or names that are recognized by name parser 244, which will be displayed in who field 724 in calendar entry 718.

In some embodiments, the embedded link 512 is stored in the corresponding email message 256 in email database 254 after the event parameters are determined (604) and before the email message is sent to the client (606). In some embodiments, the event parameters are determined (604) just after the user requests the corresponding email message (i.e., the event parameters are determined "on the fly" in response to the user's request for the corresponding email message) and the embedded link 512 is not stored in the corresponding email message in email database 254 before the message is sent to the client (606).

Client 104 receives (608) the email message 256 with the embedded link 512 from a remote computer (e.g., server 102). As noted above, the embedded link 512 contains event information corresponding to multiple parameters for an event described in the email message 256. In some embodiments, the multiple parameters are determined by server 102 analyzing the email message 256 without human intervention (e.g., using text parsers 232 to automatically analyze the message).

Client 104 receives user input that activates (610) the embedded link, such as the user clicking on embedded link 704 in GUI 700. One of ordinary skill in the art would recognize various ways to identify a user-initiated activity such as by recognizing a click-down event and/or click-up event, or monitoring the movement of the cursor over a period of time. This could be done, for example, by the client assistant 316 or operating system 310.

In response to activation of the embedded link, client 104 sends (612) and server 102 receives (614) a request to create a calendar entry. The request includes the event information contained in the embedded link 512.

In response to activation of the embedded link, server 102 sends (616) an electronic calendar entry form 218 or 718 (or information corresponding to entry 218 or 718) with multiple fields (e.g., 722-736) to the computer associated with the user. A plurality of the multiple fields contain event information from the embedded link 512. Because the event parameters have already been determined and placed in an embedded link 512 in the email message 256, the calendar entry form with at least some of the event parameters filled in can be rapidly sent and displayed. In some embodiments, server 102 stores the electronic calendar entry 218 or 718 (e.g., in calendar entry database 216).

In response to activation of the embedded link, client 104 receives (618) and displays (620) electronic calendar entry form 718 with multiple fields (e.g., in GUI 750 or in GUI 770). A plurality of the multiple fields contain event information from the embedded link 512.

In some embodiments, client 104 receives (622) an indication of acceptance of the created calendar entry 218 or 718 from the computer user, such as the user clicking on the save icon 720 after reviewing entry 718. In some embodiments, client 104 receives an indication from the computer user that the electronic calendar entry 718 is correct or client 104 receives modifications to the calendar entry 718 from the computer user (e.g., by the user typing in modifications to one or more fields 722-736 in entry 718 and then activating the save icon 720).

In some embodiments, client 104 receives (624) an instruction from the computer user to store the electronic calendar entry 218 or 718 on the client 104 and/or on the server 102. In some embodiments, the instruction from the computer user is the user clicking on the save icon 720. Calendar entry 218 or 718 is stored on the client (628) and/or on the server (626). In some embodiments, the calendar entry 218 or 718 is stored on the client (628) and/or on the server (626) without any indication of acceptance by the user (e.g., using an automatic save procedure that saves the calendar entry 218 or changes made to the calendar entry by the user).

In some embodiments, after activation of the embedded link and generation of a corresponding calendar entry 218 or 718, server 102 sends (630) the email message 256, along with a link to the corresponding calendar entry 218 or 718, to the computer associated with the user (e.g., client 104). Client 104 receives (632) and displays (634) the email message 256, along with a link to the corresponding calendar entry 218 or 718. In this embodiment, when the user views the email message 256, a link 798 to the corresponding calendar entry 218 or 718, rather than a link 704 to create a calendar entry, is displayed. In some embodiments, the link to the corresponding calendar entry includes the calendar entry ID 402 in message 256. User selection or activation of the link 798 causes a web page or form with the corresponding calendar entry to be downloaded to and displayed at the client 104.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, performed on a client system having one or more processors and memory storing one or more programs for execution by the one or more processors, the method comprising:

generating an event creation link, the event creation link being associated with an electronic message;

in response to a user activating the event creation link, inferring, using one or more abductive inference rules, a plurality of parameters for an event described in the electronic message that includes event information, the inferred parameters including at least a title, a date, and a time, at least one of the plurality of parameters being unspecified after the inferring; and displaying, by the client system, a modifiable electronic calendar entry form including the inferred parameters and the at least one unspecified parameter included in the event creation link.

2. The method of claim 1, wherein the inferring the plurality of parameters includes translating matching strings from the event information into a temporal expression representation.

3. The method of claim 1, wherein the inferring the plurality of parameters includes syntactically parsing the event information.

4. The method of claim 1, further comprising storing a calendar entry based on input from a user into the modifiable electronic calendar entry form.

5. The method of claim 1, wherein the inferring the plurality of parameters further includes inferring a full name based on a nickname.

6. The method of claim 1, further comprising selecting a grammar to interpret the electronic message.

7. A non-transitory computer readable storage medium storing one or more programs configured for execution by a client system, the one or more programs comprising instructions to:
generate an event creation link associated with an electronic message;
in response to a user activating the event creation link, infer, using one or more abductive inference rules, a plurality of parameters for an event described in the electronic message that includes event information, the inferred parameters including at least a title, a date, and a time, at least one of the plurality of parameters being unspecified after the inferring; and
display a modifiable electronic calendar entry form including the inferred parameters and the at least one unspecified parameter.

8. The non-transitory computer readable storage medium of claim 7, wherein the inferring the plurality of parameters includes translating matching strings from the event information into a temporal expression representation.

9. The non-transitory computer readable storage medium of claim 7, wherein the inferring the plurality of parameters includes syntactically parsing the event information.

10. The non-transitory computer readable storage medium of claim 7, wherein the event creation link is activated by user input.

11. The non-transitory computer readable storage medium of claim 7, wherein the instructions are further configured to cause the client system to store a calendar entry based on input from a user into the modifiable electronic calendar entry form.

12. A non-transitory computer readable storage medium storing one or more programs configured for execution by a client system, the one or more programs comprising instructions to:
generate an event creation link associated with an email message;
in response to a user activating the event creation link, infer at least a first parameter and a second parameter for an event described in the email message by event information included in the email message, the inferring at least the first parameter and the second parameter including at least one of translating matching strings from the event information into a temporal expression representation and syntactically parsing the event information, a third parameter for the event being unspecified after the inferring; and
display a modifiable electronic calendar entry form including the first parameter, the second parameter, and the third parameter.

13. The non-transitory computer readable storage medium of claim 12, wherein the inferring at least the first parameter and the second parameter includes parsing text from the email message.

14. The non-transitory computer readable storage medium of claim 12, wherein the inferring at least the first parameter and the second parameter includes parsing at least two of a date, a time, and a description from the email message.

15. The non-transitory computer readable storage medium of claim 12, wherein the event creation link is activated by user input.

16. The non-transitory computer readable storage medium of claim 12, wherein the instructions are further configured to cause the client system to store a calendar entry based on input from a user into the modifiable electronic calendar entry form.

17. A cell phone comprising:
one or more processing units; and
memory storing programs that, when executed by the one or more processing units, cause the cell phone to:
generate an event creation link associated with an email message;
in response to a user activating the event creation link, infer at least a first parameter and a second parameter for an event described in the email message by event information included in the email message, the inferring at least the first parameter and the second parameter including at least one of translating matching strings from the event information into a temporal expression representation and syntactically parsing the event information, a third parameter for the event being unspecified after the inferring; and
display a modifiable electronic calendar entry form including the first parameter, the second parameter, and the third parameter.

18. The cell phone of claim 17, wherein the inferring at least the first parameter and the second parameter includes parsing text from the email message.

19. The cell phone of claim 17, wherein the inferring at least the first parameter and the second parameter includes parsing at least two of a date, a time, and a description from the email message.

20. The cell phone of claim 17, wherein the event creation link is activated by user input into the cell phone.

* * * * *